United States Patent
Kim

(10) Patent No.: US 7,357,999 B2
(45) Date of Patent: Apr. 15, 2008

(54) NANOCOMPOSITE ELECTROLYTE MEMBRANE AND FUEL CELL EMPLOYING THE SAME

(75) Inventor: Hae-kyoung Kim, Kyungki-do (KR)

(73) Assignee: Samsung SDI Co., Ltd., Suwon, Kyungki-Do (KR)

( * ) Notice: Subject to any disclaimer, the term of this patent is extended or adjusted under 35 U.S.C. 154(b) by 566 days.

(21) Appl. No.: 10/616,998

(22) Filed: Jul. 11, 2003

(65) Prior Publication Data

US 2008/0008918 A1   Jan. 10, 2008

(30) Foreign Application Priority Data

Dec. 12, 2002   (KR) ............... 10-2002-0079187

(51) Int. Cl.
  *H01M 8/00*    (2006.01)
  *H01M 8/10*    (2006.01)
  *C08K 9/04*    (2006.01)
  *C08J 5/20*    (2006.01)

(52) U.S. Cl. .................. 429/12; 429/33; 524/445; 521/27

(58) Field of Classification Search ............ None
See application file for complete search history.

(56) References Cited

U.S. PATENT DOCUMENTS

| | | | |
|---|---|---|---|
| 3,282,875 A | 11/1966 | Connolly et al. | |
| 4,358,545 A | 11/1982 | Ezzell et al. | |
| 4,940,525 A | 7/1990 | Ezzell et al. | |
| 4,985,315 A | 1/1991 | Lemoine | |
| 5,409,785 A | 4/1995 | Nakano et al. | |
| 5,422,411 A | 6/1995 | Wei et al. | |
| 5,672,439 A | 9/1997 | Wilkinson et al. | |
| 5,795,496 A | * 8/1998 | Yen et al. ............. | 252/62.2 |
| 5,795,668 A | 8/1998 | Banerjee | |
| 5,849,428 A | 12/1998 | Hamlen | |

(Continued)

FOREIGN PATENT DOCUMENTS

CN   1357565 A1   7/2002

(Continued)

OTHER PUBLICATIONS

Korean Patent Office Action and English Translation.

(Continued)

*Primary Examiner*—Patrick Joseph Ryan
*Assistant Examiner*—Karie O'Neill
(74) *Attorney, Agent, or Firm*—Buchanan Ingersoll & Rooney PC

(57) ABSTRACT

A nanocomposite electrolyte membrane capable of suppressing cross-over of a polar organic fuel and a fuel cell using the nanocomposite electrolyte membrane are provided. The nanocomposite electrolyte membrane for a fuel cell includes a polymer having cation exchange groups and silicate nanoparticles dispersed in the polymer, the silicate nanoparticles having a layered structure, and the silicate nanoparticles being intercalated with the polymer, or layers of the silicate nanoparticles being exfoliated. The nanocomposite electrolyte membrane has an improved ability to suppress permeation of polar organic fuels, such as methanol, and appropriate ionic conductivity. In addition, a fuel cell with the nanocomposite electrolyte membrane can effectively prevent cross-over of methanol used as a fuel, thereby providing improved working efficiency and extended lifespan.

30 Claims, 1 Drawing Sheet

U.S. PATENT DOCUMENTS

| | | | |
|---|---|---|---|
| 5,919,583 A * | 7/1999 | Grot et al. | 429/33 |
| 5,981,097 A | 11/1999 | Rajendran | |
| 6,054,230 A | 4/2000 | Kato | |
| 6,130,175 A | 10/2000 | Rusch et al. | |
| 6,194,474 B1 | 2/2001 | Kerres et al. | |
| 6,242,122 B1 | 6/2001 | Dohle et al. | |
| 6,410,142 B1 * | 6/2002 | Chen et al. | 428/402 |
| 6,510,047 B2 | 1/2003 | Meiners et al. | |
| 6,555,610 B1 * | 4/2003 | Blanton et al. | 524/445 |
| 6,630,265 B1 * | 10/2003 | Taft et al. | 429/33 |
| 2005/0244697 A1 * | 11/2005 | Taft et al. | 429/33 |

FOREIGN PATENT DOCUMENTS

| | | |
|---|---|---|
| JP | 2000-516014 | 11/2000 |
| JP | 2002-216777 | 8/2002 |
| JP | 2003-175340 | 6/2003 |
| JP | 2003175340 | 6/2003 |
| JP | 2004-502008 | 1/2004 |
| KR | P2002-0077673 | 10/2002 |
| WO | WO9629752 | 9/1996 |
| WO | 01/54216 A2 | 7/2001 |
| WO | 02/00773 A2 | 1/2002 |
| WO | WO02/00773 A2 | 1/2002 |

OTHER PUBLICATIONS

Japanese Office Action dated Apr. 19, 2005.

Chinese Office Action and English Translation dated Jun. 24, 2005.

* cited by examiner

NANOCOMPOSITE ELECTROLYTE MEMBRANE AND FUEL CELL EMPLOYING THE SAME

This application claims priority from Korean Patent Application No. 2002-79187, filed on Dec. 12, 2002, in the Korean Intellectual Property Office, the disclosure of which is incorporated herein in its entirety by reference.

BACKGROUND OF THE INVENTION

1. Field of the Invention

The present invention relates to a fuel cell, and more particularly, to a fuel cell to which organic fuel is fed directly.

2. Description of the Related Art

Fuel cells are known as power generators that produce electrical energy through electrochemical reactions of fuel with oxygen or air. Since they are not based on the Carnot cycle applied to thermal power generation, their theoretical power generation efficiency is very high. Fuel cells can be used as power sources for small electrical/electronic devices, including portable devices, as well as for industrial, domestic, and transportation applications.

Fuel cells known so far can be classified into polymer electrolyte membrane (PEM) cells, phosphoric acid cells, molten carbonate cells, solid oxide cells, and other kinds depending on the type of electrolyte. The working temperature of fuel cells and constituent materials therefor are determined depending on the type of electrolyte used in a cell.

According to the way of supplying fuel to the anode, fuel cells can be classified into an external reformer type where fuel is supplied to the anode after being converted into hydrogen-rich gas by an external reformer and an internal reformer type or direct fuel supply type where fuel in gaseous or liquid state is directly supplied to the anode. Common fuels to be supplied directly to an anode of a fuel cell include natural gas and methanol. However, other hydrocarbon fuels and their derivatives may be supplied to the anode.

A representative example of direct liquid fuel cells is a direct methanol fuel cell (DMFC). DMFCs use aqueous methanol solution as fuel, and a proton exchange polymer membrane with ionic conductivity as an electrolyte. DMFCs do not require an external reformer, use fuel that is convenient to handle, and have the highest potential available as potable energy sources over other kinds of fuel cells.

Electrochemical reactions occurring in a DMFC are as follows: fuel is oxidized at the anode, and oxygen is reduced into water through a reaction with hydrogen ions at the cathode.

Anode reaction: $CH_3OH + H_2O \rightarrow 6H^+ + 6e^- + CO_2$

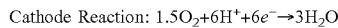

Cathode Reaction: $1.5O_2 + 6H^+ + 6e^- \rightarrow 3H_2O$

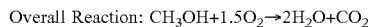

Overall Reaction: $CH_3OH + 1.5O_2 \rightarrow 2H_2O + CO_2$

As is apparent from the above reaction schemes, methanol reacts with water at the anode to produce one carbon dioxide molecule, six hydrogen ions, and six electrons. The produced hydrogen ions migrate to the cathode through a polymer electrolyte membrane and react with oxygen and electrons, which are supplied via an external circuit, at the cathode to produce water. Summarizing the overall reaction in the DMFC, water and carbon dioxide are produced through the reaction of methanol with oxygen. As a result, a substantial part of the energy equivalent to the heat of combustion of methanol is converted into electrical energy.

The polymer electrolyte membrane with proton conductivity acts as a path for migrating the hydrogen ions, which are generated through the oxidation reaction at the anode, to the cathode and as a separator between the anode and the cathode. The polymer electrolyte membrane requires ionic conductivity that is high enough to rapidly migrate a large number of hydrogen ions, electrochemical stability, mechanical strength suitable for a separator, thermal stability at working temperature, ease of processing into a thin film so that its resistance to ionic conduction can be lowered, and anti-swelling property to liquid permeation.

As a common material for this polymer electrolyte membrane, a highly fluorinated polymer with sulfonate groups, such as Nafion (a registered trademark of Dupont), having a fluorinated alkylene backbone and a fluorinated vinyl ether side chain with sulfonate groups has been used. This kind of polymer electrolyte membrane consists of hydrophilic and hydrophobic groups and can contain an amount of water therein to provide good ionic conductivity.

Theoretically, methanol reacts with water in a 1:1 ratio by mole at the anode. Therefore, it is ideal to provide a 1:1 mixture of methanol and water by mole, for example, a 64% aqueous solution of methanol by weight. However, when such a high concentration of aqueous methanol solution is used as fuel, the unreacted methanol diffuses into and crosses over the hydrophilic polymer electrolyte membrane, thereby considerably reducing the performance of the fuel cell. To prevent cross-over of methanol, the amount of unreacted methanol must be reduced. Generally, in order to reduce the amount of unreacted methanol, a low concentration of aqueous methanol solution, for example, of 6-16% by weight is used as fuel. However, use of such a low-methanol solution inevitably leads to a lower working efficiency of the fuel cell. In addition, as the methanol permeates the polymer electrolyte membrane, a cathode catalyst is poisoned by the methanol, thereby the lifespan of the fuel cell decreases.

These problems are not limited only to methanol fuel cells and are common in fuel cells using other polar organic liquid fuels. Accordingly, many attempts have been made to prevent cross-over of polar organic liquid fuels, such as methanol and ethanol, in fuel cells. For example, U.S. Pat. Nos. 5,409,785; 5,795,668; 6,054,230; 6,242,122; 5,981,097; and 6,130,175 disclose multi-layered electrolyte membranes. U.S. Pat. Nos. 5,795,496; 6,510,047; and 6,194,474 disclose electrolyte membranes composed of heat resistant polymers. U.S. Pat. Nos. 5,919,583 and 5,849,428 disclose electrolyte membranes containing inorganic particles with proton conductivity. U.S. Pat. No. 4,985,315 discloses an electrolyte membrane containing amorphous materials having protonic conductivity. U.S. Pat. No. 5,672,439 discloses the use of an electrode having double catalyst layers.

SUMMARY OF THE INVENTION

The present invention provides a nanocomposite electrolyte membrane capable of suppressing cross-over of a polar organic liquid fuel and a fuel cell employing the nanocomposite electrolyte membrane.

In accordance with one aspect of the present invention, there is provided a nanocomposite electrolyte membrane for a fuel cell, comprising: a polymer having cation exchange groups; and silicate nanoparticles dispersed in the polymer, the silicate nanoparticles having a layered structure, and the silicate nanoparticles being intercalated with the polymer, or layers of the silicate nanoparticles being exfoliated.

In accordance with another aspect of the present invention, there is provided a fuel cell comprising: a cathode where a reduction of an oxidizing agent occurs; an anode where an oxidation of fuel occurs; and the above-described nanocomposite electrolyte membrane interposed between the cathode and the anode.

BRIEF DESCRIPTION OF THE DRAWINGS

The above and other objects and advantages of the present invention will become more apparent by describing in detail exemplary embodiments thereof with reference to the attached drawing in which.

DETAILED DESCRIPTION OF THE INVENTION

Figure 1:
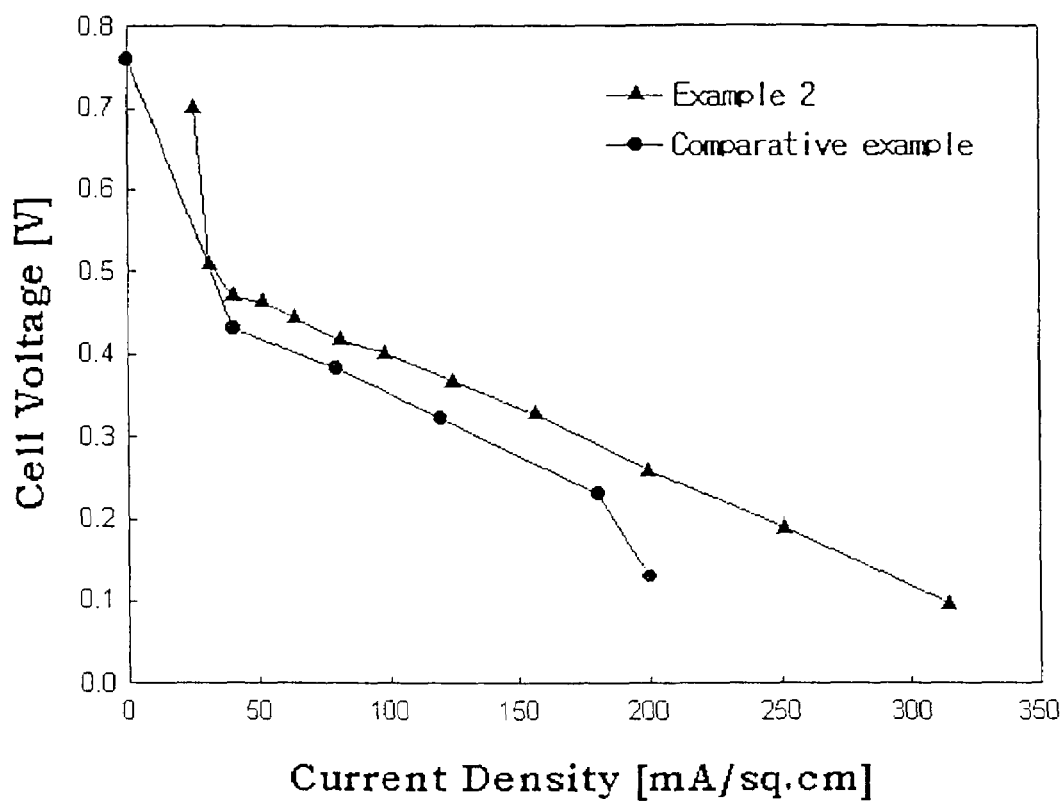
FIG. 1 is a graph comparatively showing the performance of a fuel cell according to an example of the present invention and a fuel fell according to a comparative example.

An embodiment of a nanocomposite electrolyte membrane for a fuel cell according to the present invention includes a polymer having cation exchange groups and silicate nanoparticles dispersed in the polymer, the silicate nanoparticles having a layered structure, and the silicate nanoparticles being intercalated with the polymer, or layers of the silicate nanoparticles being exfoliated.

Minerals composed of salts of silicon dioxide and metal oxides are collectively called silicate minerals. Silicates consist of larger negative ions, $SiO_4^{4-}$, and smaller positive metallic ions. The basis of crystalline structure in silicates is a $SiO_4$ tetrahedron wherein silicon atom is coordinated with four oxygen ions. Silicates are classified into nesosilicates, sorosilicates, cyclosilicates, inosilicates, phyllosilicates, tectosilicates, etc. by the bonding and arrangement types of the tetrahedrons. A representative silicate having a layered structure, among the above-listed kinds of silicates, is phyllosilcates. In phyllosilicates, adjacent $SiO_4$ tetrahedrons share each other's three oxygen atoms, thus forming a layered structure.

Silicate minerals having such a layered structure include clay minerals. Most clay minerals consist of silicon, aluminum and water and have a two- or three-layered structure similar to mica. Examples of two-layered clay minerals include kaolines, and examples of three-layered clay minerals include montmorillonite, illite, etc. Water, potassium, iron, magnesium, or other metals are incorporated into layered structures to form various clay minerals. Rock forming minerals other than quartz decompose into clay minerals.

Examples of silicates having a layered structure include smectite, vermiculite, halloysite, sericite, mica, or a mixture of the forgoing materials.

Specified examples of smectite include montmorillonite, saponite, beidellite, nontronite, hectorite, stevensite, etc.

Throughout the specification, the term "silicate nanoparticles" refer to silicate particles having an average particle diameter of about 1-100 nm.

As described above, in a nanocomposite electrolyte membrane according to the present invention, silicate nanoparticles having a layered structure are uniformly dispersed in the polymer having cation exchange groups, wherein the silicate nanoparticles are intercalated with the polymer, or the layers in the nanoparticles may be exfoliated with a larger interlayer space. Once such a nanocomposite electrolyte membrane according to the present invention soaks up water, permeation of polar organic fuel such as methanol, ethanol, etc., into the nanocomposite electrolyte membrane is suppressed. Therefore, the nanocomposite electrolyte membrane according to the present invention can effectively suppress crossover of polar organic fuels in a direct fuel cell using polar organic fuels, which are directly supplied to its anode.

If the amount of silicate nanoparticles in the nanocomposite electrolyte membrane is too small, the nanocomposite electrolyte membrane cannot effectively suppress permeation of a polar organic fuel. If the amount of silicate nanoparticles in the nanocomposite electrolyte membrane is too large, the amount of polymer acting as a binder is relatively small, and the tensile strength of the electrolyte membrane is considerably weakened. In view of this, the amount of silicate nanoparticles in the nanocomposite electrolyte membrane is preferably in a range of, for example, about 1-30% by weight, more preferably, about 3-10% by weight, based on the weight of the nanocomposite electrolyte membrane.

A polymer which can be used in a nanocomposite electrolyte membrane according to the present invention may have cation exchange groups selected from the group consisting of, for example, a sulfonate group, a carboxyl group, a phosphoric acid group, an imide group, a sulfonimide group, a sulfonamide group, and a hydroxyl group.

Examples of a polymer with cation exchange groups includes a homopolymer and a copolymer made from trifluoroethylenes, tetrafluoroethylenes, styrene-divinyl benzenes, α, β, β-trifluorostyrenes, styrenes, imides, sulfones, phosphazenes, etherether ketones, polyphenylene sulfides, or aromatic groups, a derivative of the homopolymers and the copolymers, and a mixture of the foregoing polymers.

A preferred polymer with cation exchange groups is a highly fluorinated polymer containing fluorine atoms that amount to at least 90% of the total number of fluorine and hydrogen atoms bound to carbon atoms of the backbone and side chains of the polymer. A more preferred polymer with cation exchange groups is a highly fluorinated polymer with sulfonate groups as proton exchange groups at the terminals of side chains and containing fluorine atoms that amount to at least 90% of the total number of fluorine and hydrogen atoms bound to carbon atoms of the backbone and side chains of the polymer. Any polymer with cation exchange groups, for example, those disclosed in U.S. Pat. Nos. 3,282,875; 4,358,545; 4,940,525; and 5,422,411, are available.

Examples of a polymer with cation exchange groups include a homopolymer derived from monomers having the formula of $MSO_2CFR_fCF_2O[CFYCF_2O]_nCF=CF_2$ and a copolymer derived from the monomers of the formula above and at least one monomer selected from the group consisting of ethylene, halogenated ethylene, perfluorinated α-olefin, perfluoroalkylvinyl ether. In the formula above, $R_f$ is a radical selected from fluorine and a $C_1$-$C_{10}$ perfluoroalkyl group; Y is a radical selected from fluorine and a trifluoromethyl group; n is an integer from 1 to 3; M is a radical selected from fluorine, a hydroxyl group, an amino group, and a —OMe where Me is a radical selected from alkaline metal and a quaternary ammonium group.

Another example of a polymer with cation exchange groups is a polymer having the carbon backbone substantially substituted with fluorine and pendant groups having the formula of —O—$[CFR'_f]_b[CFR_f]_aSO_3Y$ where a is an integer from 0 to 3; b is an integer from 0 to 3; a+b is greater than or equal to 1; $R_f$ and $R'_f$ are independently selected from halogen atom and a substantially fluorinated alkyl group; and Y is hydrogen or alkaline metal.

Still another example of a polymer with cation exchange groups is a sulfonic fluoropolymer having the fluorinated backbone and pendent groups having the formula of $ZSO_2—[CF_2]_a—[CFR_f]_b—O—$ where Z is halogen, alkaline metal, hydrogen, or —OR where R is a $C_1$-$C_{10}$ alkyl or aryl radical; a is an integer from 0 to 2; b is an integer from 0 to 2; a+b is not equal to zero; $R_f$ is selected from fluorine, chlorine, a $C_1$-$C_{10}$ perfluoroalkyl group, and a $C_1$-$C_{10}$ fluorochloroalkyl group.

Another example of a polymer with cation exchange groups is a polymer having the following formula:

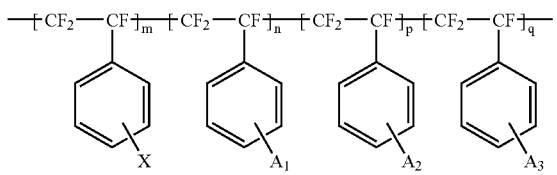

where m is an integer greater than 0; at least one of n, p, and q is an integer greater than 0; $A_1$, $A_2$, and $A_3$ are independently selected from an alkyl group, halogen atom, $C_yF_{2y+1}$ where y is an integer greater than 0, —OR (where R is an alkyl group, a perfluoroalkyl group, or an aryl group), $CF=CF_2$, CN, $NO_2$, and OH; and X is selected from $SO_3H$, $PO_3H_2$, $CH_2PO_3H_2$, COOH, $OSO_3H$, $OPO_3H_2$, $OArSO_3H$ (where Ar is an aromatic group), $NR_3^+$ (where R is an alkyl group, a perfluoroalkyl group, or an aryl group), $CH_2NR_3^+$ (where R is an alkyl group, a perfluoroalkyl group, or an aryl group).

The polymer with cation exchange groups used in a nanocomposite electrolyte membrane according to the present invention provides cationic conductivity, for example, proton conductivity, and acts as a binder for the silicate nanoparticles.

The thickness of the nanocomposite electrolyte membrane according to the present invention is not limited. However, if the nanocomposite electrolyte membrane is too thin, the strength of the nanocomposite electrolyte membrane is greatly weakened. If the nanocomposite electrolyte membrane is too thick, internal resistance of the fuel cell is too high. In view of this, the thickness of the nanocomposite electrolyte membrane according to the present invention may be in a range of about 30-200 μm.

An example of a method of manufacturing a nanocomposite electrolyte membrane according to the present invention will be described below.

To make it easier to intercalate the polymer between the layers of the silicate nanoparticles, it is preferable to enlarge the interlayer distance in the silicate nanoparticle. To this end, for example, a cationic surfactant is adsorbed onto the silicate nanoparticles. In particular, silicate nanoparticles are immersed in a cationic surfactant and washed with water to remove excess ions. During this process, the ion exchange process for the silicate nanoparticles take place, thus the interlayer distance in the nanoparticle increases.

Examples of a cation surfactant include, but are not limited to, organic onium cations. Organic onium cations may be derived from ammonium salts. Examples of organic onium cations derived from ammonium salts include, but are not limited to, cetyl pyridium chloride, lauryl pyridium chloride, and n-hexadecyl trimethylammonium bromide.

Throughout this specification, silicate nanoparticles which have adsorbed adsorbed a cation surfactant are termed "swelled nanoparticles."

Next, to mix the swelled nanoparticles with a polymer having cation exchange groups, a polymer solution in an organic solvent is prepared. Examples of an organic solvent, but are not limited to, tetrahydrofuran (THF), di-methylformamide (DMF), n-methylpyrrolidinone (NMP), and isopropyl alcohol (IPA), which may be used alone or in combination. In addition, water or a mixture of water and an organic solvent selected from among the above examples may be used to prepare the polymer solution, instead of the organic solvent.

The swelled nanoparticles are added to and dispersed in the polymer solution with stirring. During this process, intercalation of the polymer and/or exfoliation of the nanoparticles occur.

Various methods, including solvent casting, can be applied to mold a nanocomposite electrolyte membrane using the polymer solution containing the swelled nanoparticles dispersed therein. After molding the nanocomposite electrolyte membrane, the organic solvent is evaporated to provide a complete nanocomposite electrolyte membrane.

Hereinafter, an embodiment of manufacturing a fuel cell with a nanocomposite electrolyte membrane according to the present invention will be described.

A nanocomposite electrolyte membrane according to the present invention can be applied to any kind of fuel cells which employ an electrolyte membrane containing polymer electrolyte, for example, PEMFC using hydrogen as fuel. In particular, the nanocomposite electrolyte membrane according to the present invention is more useful in direct methanol fuel cells using a mixed vapor of methanol and water or an aqueous methanol solution as a fuel.

The present invention provides a fuel cell with the above-described nanocomposite electrolyte membrane according to the present invention between a cathode, where oxygen is reduced, and an anode, where fuel is oxidized.

The cathode includes a catalyst layer for facilitating oxygen reduction. This catalyst layer contains catalyst particles and a polymer with cation exchange groups. For example, a carbon supported platinum (Pt/C) catalyst can be used as the cathode catalyst.

The anode includes a catalyst layer for facilitating the oxidation of fuel, such as hydrogen, natural gas, methanol, ethanol, etc. This anode catalyst layer contains catalyst particles and a polymer with cation exchange groups. Examples of a catalyst for the anode catalyst layer include, but are not limited to, a Pt/C catalyst, a carbon supported platinum-ruthenium (Pt—Ru/C) catalyst, etc. The Pt—Ru/C catalyst is more useful in fuel cells in which organic fuels, except for hydrogen, are directly supplied to their anode.

Each catalyst for the cathode and the anode contains catalytic metal particles and a catalyst carrier. Suitable catalyst carriers include conductive solid powder, such as carbon powder, with micropores for incorporating catalytic metal particles therein. Examples of carbon powder include carbon black, Ketzen black, acetylene black, activated carbon powder, carbon nano-fibers, and a mixture of the forgoing materials. The above-described examples of polymers having cation exchange groups can be used for the cathode and anode catalyst layers.

The cathode catalyst and anode catalyst layers directly contact the nanocomposite electrolyte membrane.

Each of the cathode and the anode may further include a gas diffusion layer. The gas diffusion layer contains porous materials with electrical conductivity and acts as a current collector and as an entry/exit path of reactants and reaction products. Examples of the gas diffusion layer include, but are not limited to, carbon paper, and preferably, waterproofed carbon paper, and more preferably, waterproofed carbon paper with a waterproofed carbon black layer. Waterproofed carbon paper for the gas diffusion layer contains a hydrophobic polymer, such as polytetrafluoroethylene (PTFE), which is sintered. The use of waterproofed materials for the gas diffusion layer is for enabling both polar liquid and gaseous reactants to pass through the gas diffusion layer. In waterproofed carbon paper with a waterproofed carbon black layer, the waterproofed carbon black layer contains carbon black and a hydrophobic polymer, such as PTFE, as a binder. This waterproofed carbon black layer is attached to a surface of a waterproofed carbon paper as described above. The hydrophobic polymer of the waterproofed carbon black layer is sintered.

A various methods disclosed in many references can be used to manufacture the cathode and the anode. Thus, detailed descriptions thereon will be omitted here.

Fuels which can be supplied to the anode of a fuel cell according to the present invention include hydrogen, natural gas, methanol, ethanol, etc. Preferred fuels include aqueous solutions of polar organic fuels, for example, methanol, ethanol, etc. A more preferred fuel is an aqueous methanol solution. A fuel cell according to the present invention is compatible with a higher concentration of aqueous methanol fuel because the cross-over of polar organic fuels is greatly suppressed by the nanocomposite electrolyte membrane, in contrast to conventional DMFCs that allow only to use a low-concentration methanol solution of 6-15% due to the problem of methanol cross-over. Obviously, in the case of using of a low-concentration of methanol solution, since the nanocomposite electrolyte membrane of the fuel cell according to the present invention can suppress cross-over of a polar organic fuel, the fuel cell have a further extended lifespan and a further improved energy efficiency.

The present invention will be described in greater detail with reference to the following examples. The following examples are for illustrative purposes and are not intended to limit the scope of the invention.

EXAMPLE 1

Manufacture of a Nanocomposite Electrolyte Membrane 10 g of Montmorillonite K10 (having nano-sized particles, available from Aldrich Co.) with a surface area of 220-270 m$^2$/g, 0.1 g of cetyl pyridium chloride, and 30 mL of deionized water were mixed with stirring for 24 hours. The mixture was filtered to separate montmorillonite nanoparticles. The separated montmorillonite nanoparticles were washed, three times, with deionized water and deep-frozen to provide swelled montmorillonite nanoparticles.

A commercial Nafion solution (available from Dupont) was used as a polymer solution with cation exchange groups. Nafion solutions produced by Dupont are perfluorinated polymers with sulfonate groups as cation exchange groups.

A mixture of 0.1 g of the swelled montmorillonite nanoparticles in a Nafion solution containing 1 g of Nafion was vigorously stirred at about 80° C. for about 70 hours to provide a slurry for forming a nanocomposite electrolyte membrane.

The resulting slurry was deposited on a glass substrate and dried at about 130° C. for about 4 hours to form a nanocomposite electrolyte membrane having a thickness of about 150 μm.

EXAMPLE 2

Manufacture of a Fuel Cell with a Nanocomposite Electrolyte Membrane

A fuel cell was manufactured from the nanocomposite electrolyte membrane of Example 1, an anode with a Pt—Ru catalyst, and a cathode with a Pt catalyst. Variation in cell voltage with respect to current density was measured for the fuel cell. The results are shown in FIG. 1. The working temperature was about 50° C., a 2M methanol solution was used as a fuel, and air was used as an oxidizing agent.

COMPARATIVE EXAMPLE

A fuel cell was manufactured in the same manner as in Example 2, except that Nafion 115 (available from Dupont) was used instead of the nanocomposite electrolyte membrane manufactured in Example 1. Variation in cell voltage with respect to current density was measured for the fuel cell under the same conditions as in Example 2. The results are shown in FIG. 1.

Evaluation Test 1: Ionic Conductivity Comparison

The ionic conductivity of the nanocomposite electrolyte membrane manufactured in Example 1 was measured using a 4-point probe method at 25° C., 50° C., and 75° C. For comparison, the ionic conductivity of Nafion 117 (commercially available from Dupont) was also measured. The results are shown in Table 1 below.

TABLE 1

| Sample | 25° C. | 50° C. | 75° C. |
| --- | --- | --- | --- |
| Example 1 | 0.046 S/cm | 0.066 S/cm | 0.11 S/cm |
| Nafion 117 | 0.060 S/cm | NA | 0.12 S/cm |

NA; Not available

As is apparent from Table 1 above, the nanocomposite electrolyte membrane of Example 1 shows an ionic conductivity that is nearly equivalent to Nafion 117, indicating that the nanocomposite electrolyte membrane according to the present invention has a sufficient ionic conductivity for use in fuel cells, in spite of containing the nanoparticles.

Evaluation Test 2: Anti-Methanol Permeation Performance

When methanol permeates a nanocomposite electrolyte membrane, the nanocomposite electrolyte membrane swells and increases in volume. Based on this phenomenon, anti-methanol permeation performance was measured, using the nanocomposite electrolyte membrane manufactured in Example 1, from a degree of swelling in a methanol solution.

The nanocomposite electrolyte membrane of Example 1 was immersed, separately, in a 4M methanol solution and a 1:1 methanol and water solution by mole, each for 2 hours, and volume increases were measured. For comparison, volume increases of Nafion 117 (available from Dupont) in the same solutions were measured. The results are shown in Table 2 below. In Table 2, the percentages are the percentage volume increase with respect to the initial volume of the electrolyte membrane prior to immersion.

TABLE 2

| Sample | 4M methanol solution | 1:1 methanol and water solution by mole |
|---|---|---|
| Example 1 | 0.80% | 40% |
| Nafion 117 | 62% | 124% |

As is apparent from Table 2 above, volume increases after immersion in the methanol solutions are much smaller for the nanocomposite electrolyte membrane of Example 1 than Nafion 117, indicating the improved anti-methanol permeation performance of the nanocomposite electrolyte membrane of Example 1. It will be obvious to those skilled in the art that this anti-methanol permeation effect of the nanocomposite electrolyte membrane is apparent for other polar organic fuels, including ethanol.

Therefore, when the nanocomposite electrolyte membrane according to the present invention is applied to a fuel cell using a methanol solution as a fuel, cross-over of the methanol can be effectively suppressed, with improved working efficiency and longer lifespan of the fuel cell.

Evaluation Test 3: Fuel Cell Performance Comparison

Variation in cell voltage with respect to current density was measured using the fuel cell of Example 2 and the fuel cell of Comparative Example. As illustrated in FIG. 1, the cell voltage of the fuel cell of Example 2 is higher than the cell voltage of the fuel cell of Comparative Example at a given current density, indicating a greater working efficiency of the fuel cell of Example 1. This result also supports that the nanocomposite electrolyte membrane according to the present invention has good ionic conductivity, in addition to the ability to effectively suppress cross-over of methanol.

As described above, a nanocomposite electrolyte membrane according to the present invention has an improved ability to suppress permeation of polar organic fuels, such as methanol, and appropriate ionic conductivity. In addition, a fuel cell with the nanocomposite electrolyte membrane according to the present invention can effectively prevent cross-over of methanol used as a fuel, thereby providing improved working efficiency and extended lifespan.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A nanocomposite electrolyte membrane for a fuel cell, comprising:
   a polymer having cation exchange groups; and
   silicate nanoparticles dispersed in the polymer, the silicate nanoparticles having a layered structure, and the silicate nanoparticles being intercalated with the polymer, or layers of the silicate nanoparticles being exfoliated.

2. The nanocomposite electrolyte membrane of claim 1, wherein the silicate is selected from the group consisting of smectite, vermiculite, halloysite, sericite, mica, and a mixture of the forgoing materials.

3. The nanocomposite electrolyte membrane of claim 2, wherein the silicate comprises smectite and the smectite is selected from the group consisting of montmorillonite, saponite, beidellite, nontronite, hectorite, stevensite, and a mixture of the forgoing materials.

4. The nanocomposite electrolyte membrane of claim 1, wherein the silicate nanoparticles have an average diameter of 1-100 nm.

5. The nanocomposite electrolyte membrane of claim 1, wherein the amount of the silicate nanoparticles is in a range of 1-30% based on the total weight of the nanocomposite electrolyte membrane.

6. The nanocomposite electrolyte membrane of claim 1, wherein the cation exchange groups of the polymer are selected from the group consisting of a sulfonate acid group, a carboxyl group, a phosphoric acid group, an imide group, a sulfonimide group, a sulfonamide group, and a hydroxyl group.

7. The nanocomposite electrolyte membrane of claim 1, wherein the polymer with cation exchange groups is a homopolymer or a copolymer of trifluoroethylenes, tetrafluoroethylenes, styrene-divinyl benzenes, $\alpha,\beta,\beta$-trifluorostyrenes, styrenes, imides, sulfones, phosphazenes, etherether ketones, ethylene oxides, polyphenylene sulfides, or aromatic groups, or a derivative of the homopolymers and the copolymers, or a mixture of the forgoing materials.

8. The nanocomposite electrolyte membrane of claim 1, wherein the polymer is a highly fluorinated polymer with sulfonate groups as proton exchange groups at the terminals of side chains and containing fluorine atoms that amount to at least 90% of the total number of fluorine and hydrogen atoms bound to carbon atoms of the backbone and side chains of the polymer.

9. The nanocomposite electrolyte membrane of claim 1, having a thickness of 30-200 µm.

10. A fuel cell comprising:
    a cathode where a reduction of an oxidizing agent occurs;
    an anode where an oxidation of fuel occurs; and
    the nanocomposite electrolyte membrane according to claim 1 interposed between the cathode and the anode.

11. The fuel cell of claim 10, wherein the cathode comprises a catalyst layer containing carbon supported platinum catalyst.

12. The fuel cell of claim 10, wherein the anode comprises a catalyst layer containing carbon supported platinum catalyst.

13. The fuel cell of claim 10, wherein the anode comprises a catalyst layer containing carbon supported platinum-ruthenium catalyst.

14. The fuel cell of claim 10, wherein the silicate is selected from the group consisting of smectite, vermiculite, halloysite, sericite, mica, and a mixture of the forgoing materials.

15. The fuel cell of claim 14, wherein the silicate comprises smectite and the smectite is selected from the group consisting of montmorillonite, saponite, beidellite, nontronite, hectorite, stevensite, and a mixture of the forgoing materials.

16. The fuel cell of claim 10, wherein the silicate nanoparticles have an average diameter of 1-100 nm.

17. The fuel cell of claim 10, wherein the amount of the silicate nanoparticles is in a range of 1-30% based on the total weight of the nanocomposite electrolyte membrane.

18. The fuel cell of claim 10, wherein the cation exchange groups of the polymer are selected from the group consisting of a sulfonate acid group, a carboxyl group, a phosphoric acid group, an imide group, a sulfonimide group, a sulfonamide group and a hydroxyl group.

19. The fuel cell of claim 10, wherein the polymer with cation exchange groups is a homopolymer or a copolymer of trifluoroethylenes, tetrafluoroethylenes, styrene-divinyl benzenes, $\alpha,\beta,\beta$-trifluorostyrenes, styrenes, imides, sulfones, phosphazenes, etherether ketones, ethylene oxides, polyphenylene sulfides, or aromatic groups, or a derivative of the homopolymers and the copolymers, or a mixture of the forgoing materials.

20. The fuel cell of claim 10, wherein the polymer is a highly fluorinated polymer with sulfonate groups as proton exchange groups at the terminals of side chains and containing fluorine atoms that amount to at least 90% of the total number of fluorine and hydrogen atoms bound to carbon atoms of the backbone and side chains of the polymer.

21. The fuel cell of claim 10, wherein the nanocomposite electrolyte membrane has a thickness of 30-200 μm.

22. The nanocomposite electrolyte membrane of claim 1, further comprising a cationic surfactant, wherein the cationic surfactant comprises organic onium cations.

23. The nanocomposite electrolyte membrane of claim 22, wherein the organic onium cations comprise cetylpyridium chloride, lauryl pyridium chloride, or n-hexadecyl trimethylammonium bromide.

24. The fuel cell of claim 10, further comprising a cationic surfactant, wherein the cationic surfactant comprises organic onium cations.

25. The fuel cell of claim 24, wherein the organic onium cations comprise cetylpyridium chloride, lauryl pyridium chloride, or n-hexadecyl trimethylammonium bromide.

26. A nanocomposite electrolyte membrane for a fuel cell consisting essentially of:
   a polymer having cation exchange groups;
   silicate nanoparticles dispersed in the polymer; and
   cationic surfactant adsorbed within the silicate nanoparticles.

27. The nanocomposite electrolyte membrane of claim 26, wherein the cationic surfactant comprises organic onium cations.

28. The nanocomposite electrolyte membrane of claim 27, wherein the organic onium cations comprise cetylpyridium chloride, lauryl pyridium chloride, or n-hexadecyl trimethylammonium bromide.

29. A method of forming a nanocomposite electrolyte membrane, comprising:
   mixing silicate nanoparticles with surfactant, water and a polymer having cation exchange groups; and
   drying the mixture to form a nanocomposite electrolyte membrane.

30. A nanocomposite electrolyte membrane for a fuel cell, comprising:
   a polymer having cation exchange groups; and
   silicate nanoparticles dispersed in the polymer, the silicate nanoparticles having a layered structure, and the silicate nanoparticles being intercalated with the polymer, or layers of the silicate nanoparticles being exfoliated;
   wherein the polymer having cation exchange groups comprises:
   a homopolymer derived from monomers having the formula of $MSO_2CFR_fCF_2O[CFYCF_2O]_nCF{=}CF_2$ and a copolymer derived from the monomers of the formula above and at least one monomer selected from the group consisting of ethylene, halogenated ethylene, perfluorinated α-olefin, perfluoroalkylvinyl ether, wherein $R_f$ is a radical selected from fluorine and a $C_1$-$C_{10}$ perfluoroalkyl group; Y is a radical selected from fluorine and a trifluoromethyl group; n is an integer from 1 to 3; and M is a radical selected from fluorine, a hydroxyl group, an amino group, and a —OMe where Me is a radical selected from alkaline metal and a quaternary ammonium group;
   a polymer having the carbon backbone substantially substituted with fluorine and pendant groups having the formula of —O—$[CFR'_f]_b[CFR_f]_aSO_3Y$ where a is an integer from 0 to 3; b is an integer from 0 to 3; a+b is greater than or equal to 1; $R_f$ and $R'_f$ are independently selected from halogen atom and a substantially fluorinated alkyl group; and Y is hydrogen or alkaline metal; or
   a sulfonic fluoropolymer having the fluorinated backbone and pendent groups having the formula of $ZSO_2$—$[CF_2]_a$—$[CFR_f]_b$—O— where Z is halogen, alkaline metal, hydrogen, or —OR where R is a $C_1$-$C_{10}$ alkyl or aryl radical; a is an integer from 0 to 2; b is an integer from 0 to 2; a+b is not equal to zero; and $R_f$ is selected from fluorine, chlorine, a $C_1$-$C_{10}$ perfluoroalkyl group, and a $C_1$-$C_{10}$ fluorochloroalkyl group.

* * * * *